United States Patent
Jiang

(10) Patent No.: US 6,538,879 B2
(45) Date of Patent: Mar. 25, 2003

(54) ASSEMBLY FRAME OF COMPUTER HOUSING CAPABLE OF ROTATING AND POSITIONING

(75) Inventor: Yue-Wen Jiang, Chia I Hsien (TW)

(73) Assignee: Lite-On Enclosure Inc., Taipei (TW)

( * ) Notice: Subject to any disclaimer, the term of this patent is extended or adjusted under 35 U.S.C. 154(b) by 36 days.

(21) Appl. No.: 09/917,624

(22) Filed: Jul. 31, 2001

(65) Prior Publication Data

US 2003/0026069 A1 Feb. 6, 2003

(51) Int. Cl.$^7$ .............................. G06F 1/16; A47F 7/00
(52) U.S. Cl. ..................... 361/683; 361/727; 211/26; 211/41; 312/223.1
(58) Field of Search ................................. 361/679–727; 312/223.1, 223.2, 330.1; 211/26, 41

(56) References Cited

U.S. PATENT DOCUMENTS 5,584,396 A * 12/1996 Schmitt ...................... 361/727
5,995,364 A * 11/1999 McAnally et al. ........... 361/685
6,272,009 B1 * 8/2001 Buican et al. ............... 361/683
6,313,983 B1 * 11/2001 Liu et al. .................... 361/683
6,386,656 B1 * 5/2002 Chen ......................... 312/223.2

* cited by examiner

Primary Examiner—Gerald Tolin
Assistant Examiner—Lisa Lea-Edmonds
(74) Attorney, Agent, or Firm—Rosenberg, Klein & Lee

(57) ABSTRACT

The present invention provides an assembly frame of computer housing capable of rotating and positioning, which comprises a frame body, a first assembly frame, a second assembly frame, a slide structure, and a retaining device. The first assembly frame is fixedly locked in the frame body. The second assembly frame is pivotally joined on the frame body. Through sliding of the slide structure, the second assembly frame can be turned over outwards to facilitate assembly or disassembly for a computer maintenance man. Contrarily, the second assembly frame can reach a predetermined position to let the second assembly frame be hooked on the first assembly frame through retaining of the retaining device, thereby achieving the object of positioning.

9 Claims, 7 Drawing Sheets

ASSEMBLY FRAME OF COMPUTER HOUSING CAPABLE OF ROTATING AND POSITIONING

FIELD OF THE INVENTION

The present invention relates to an assembly frame of computer housing capable of rotating and positioning and, more particularly, to an assembly frame of computer housing capable of rotating and positioning, which can be quickly turned over or positioned to facilitate assembly or disassembly of cables of hardware subassemblies for a computer maintenance man.

BACKGROUND OF THE INVENTION

As shown in FIG. 1, a plurality of screws 10a are used to fixedly lock a first assembly frame 11a and a second assembly frame 12a in a conventional computer housing 1a. The first assembly frame 11a and the second assembly frame 12a are used to lock hardware subassemblies (not shown) such as floppy disk drives, hard disk drives, or CD-ROM drives to form a basic architecture of computer. Because the first assembly frame 11a and the second assembly frame 12a are stacked together, and are fixedly locked on the computer housing 1a with the screws 10a, much inconvenience arises when a computer maintenance man wants to assemble or disassemble cables of hardware subassemblies (not shown). On the one hand, because computer subassemblies such as a motherboard (not shown) and so on are installed in the computer housing 1a, in order to let the computer housing 1a not occupy excessive space, the remaining space therein is small so that it is hard to stick hands thereinto for inserting or disassembling cables. On the other hand, various kinds of computer subassemblies, especially cables, are intricate so that a computer maintenance man cannot clearly discriminate them.

Accordingly, the above assembly frame of computer housing has inconvenience and drawbacks in practical use. The present invention aims to resolve the above problems in the prior art.

SUMMARY OF THE INVENTION

The primary object of the present invention is to provide an assembly frame of computer housing capable of rotating and positioning, which can be turned over by means pivotally joining or sliding to facilitate discrimination of cables for a computer maintenance man. Moreover, the object of positioning can be achieved by means of retaining. The assembly frame of computer housing can also be quickly unlocked or positioned.

To achieve the above object, the present invention provides an assembly frame of computer housing comprising a frame body, a first assembly frame, a second assembly frame, a slide structure, and a retaining device. The first assembly frame is fixedly locked in the frame body. The second assembly frame is pivotally joined on the frame body. Through sliding of the slide structure, the second assembly frame can be turned over outwards to facilitate assembly or disassembly for a computer maintenance man. Contrarily, through retaining of the retaining device, the second assembly frame can reach a predetermined position to be hooked on the first assembly frame, thereby achieving the object of positioning.

The various objects and advantages of the present invention will be more readily understood from the following detailed description when read in conjunction with the appended drawing, in which:

DETAILED DESCRIPTION OF THE PREFERRED EMBODIMENTS

Figure 1:
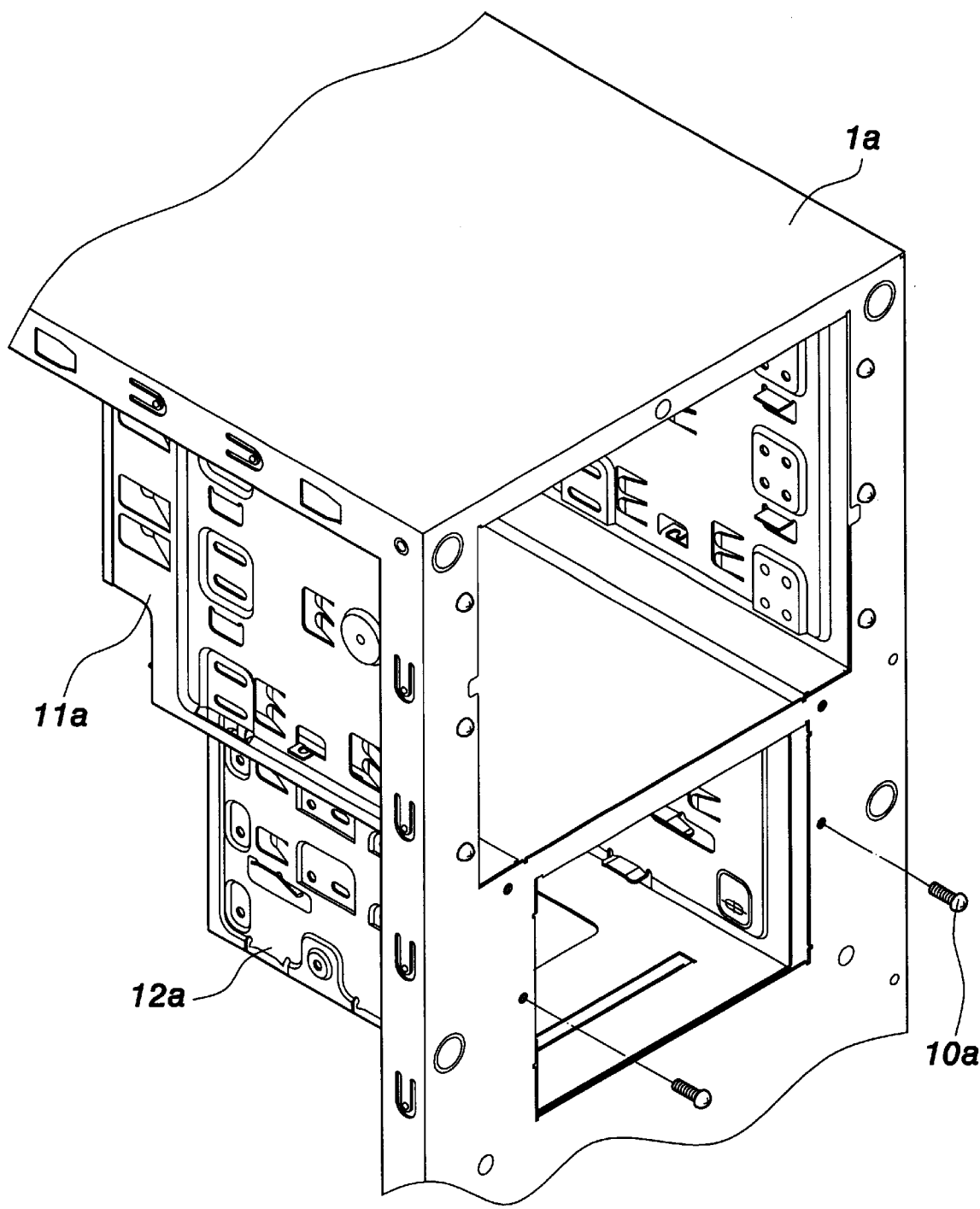
FIG. 1 is a perspective view of a prior art assembly frame of computer housing.
Figure 2:
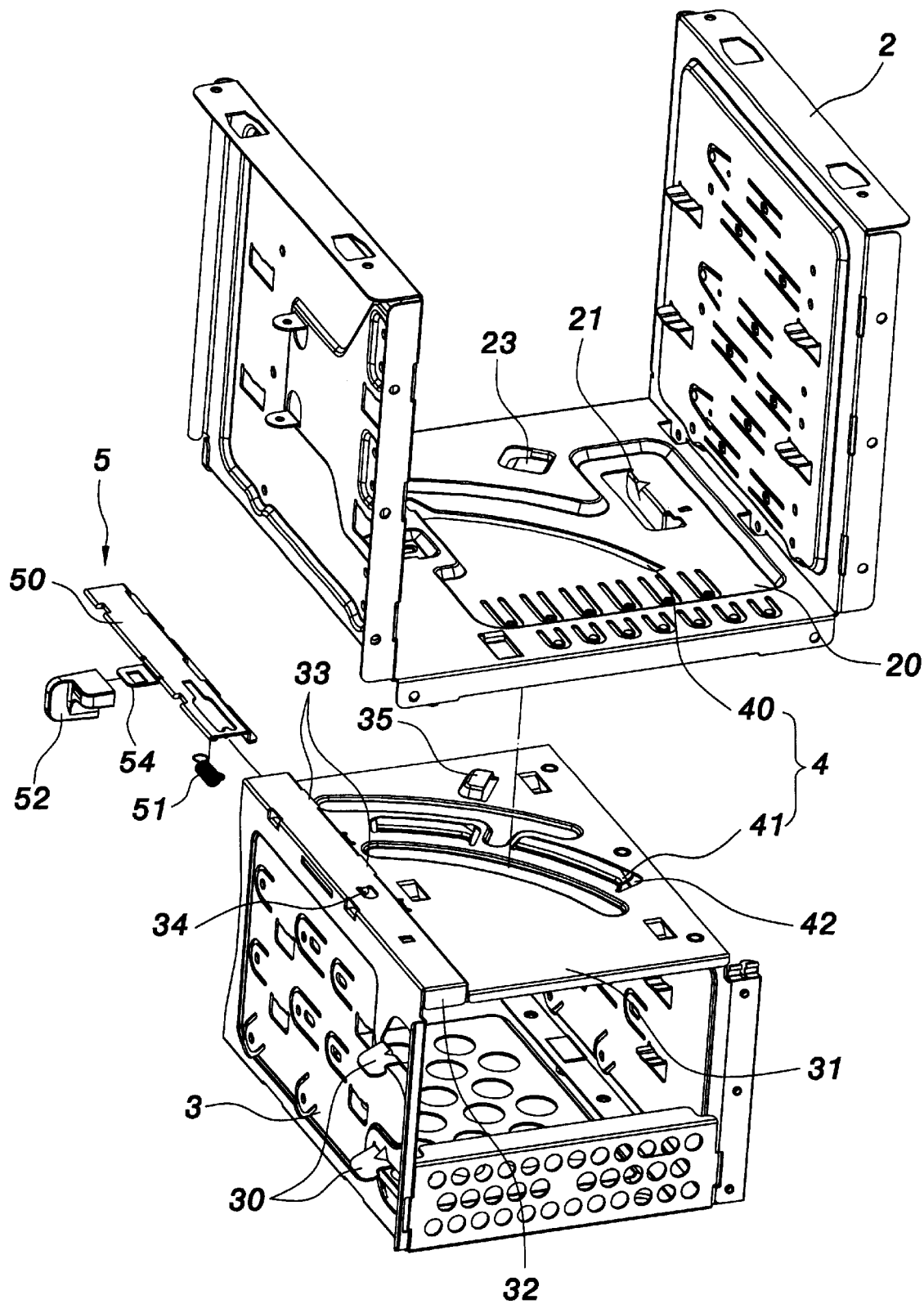
FIG. 2 is an exploded perspective view of the present invention.
Figure 3:
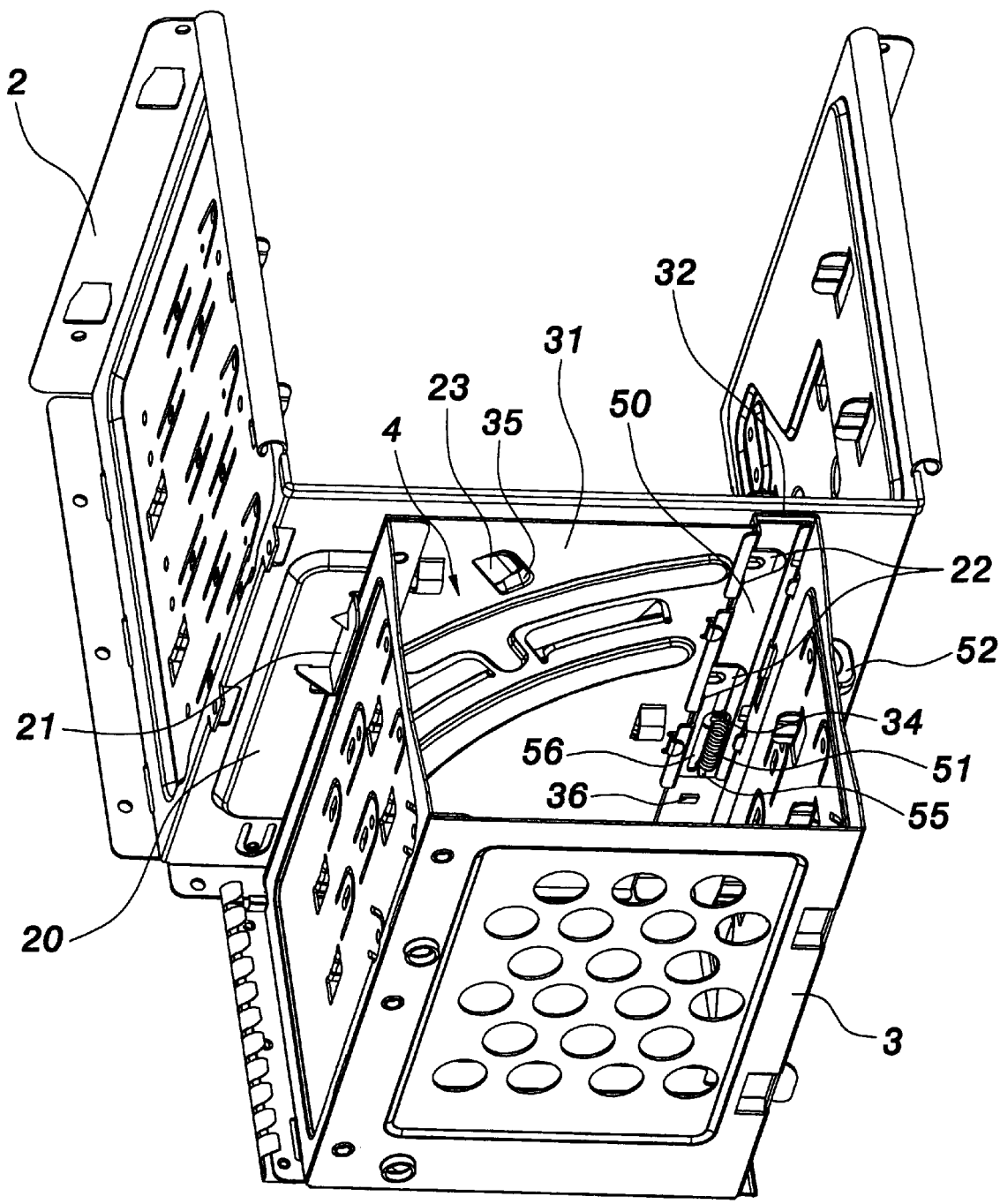
FIG. 3 is a perspective view of the present invention.
Figure 4:
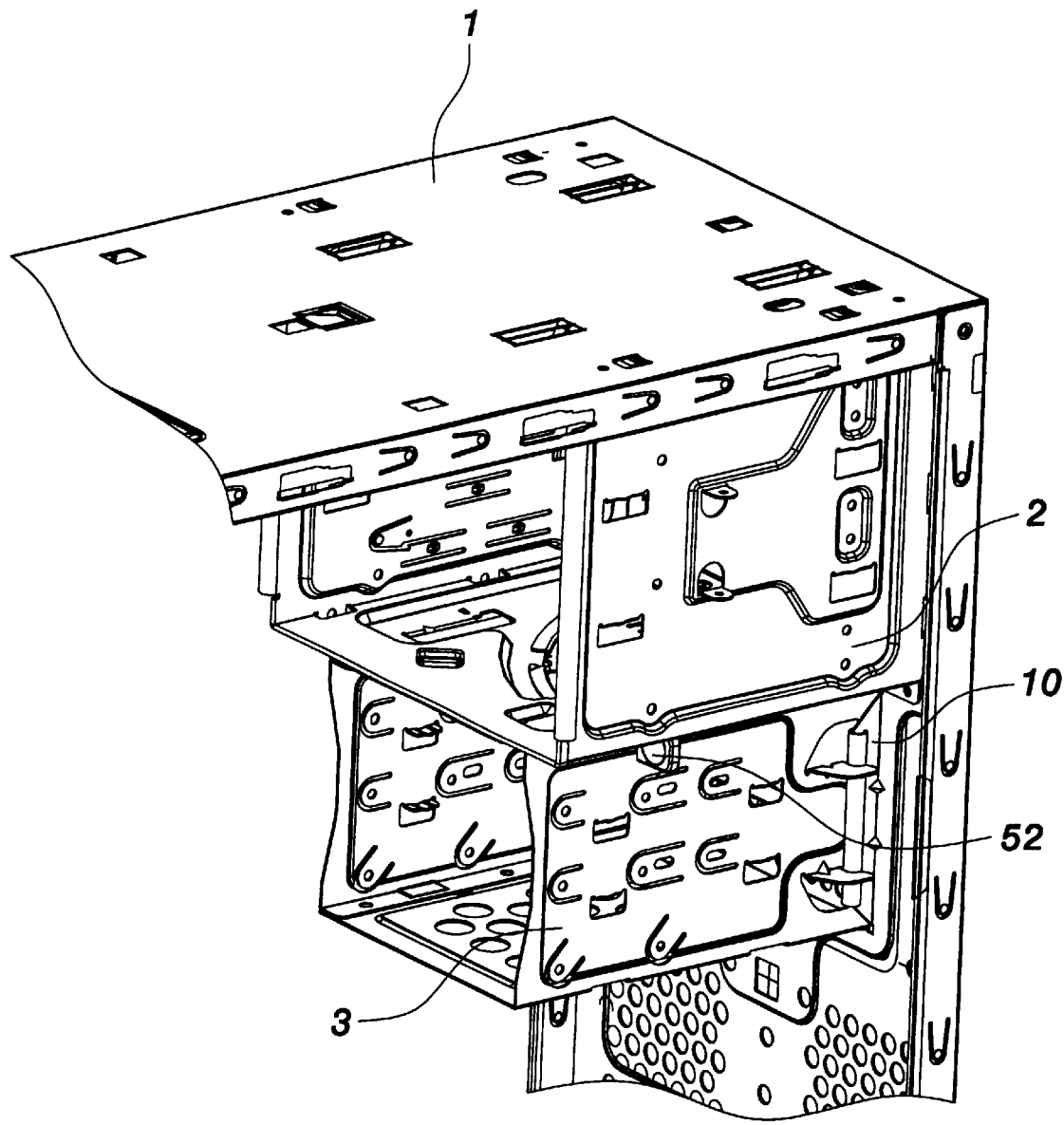
FIG. 4 is a perspective view of the present invention disposed on a frame body.

As shown in FIGS. 2, 3, and 4, the present invention provides an assembly frame of computer housing capable of rotating and positioning, which comprises a frame body 1, a first assembly frame 2, a second assembly frame 3, a slide structure 4, and a retaining device 5. The frame body 1 is a hollow frame wherein computer subassemblies such as a motherboard (not shown) and so on can be installed. A pivotal part 10 is disposed at a predetermined position of the frame body 1.

The first assembly frame 2 is fixedly locked in the frame body 1, and is used to lock hardware subassemblies (not shown) such as floppy disk drives, hard disk drives, or CD-ROM drives. The first assembly frame 2 has a fixing face 20 projecting downwards. The fixing face 20 has a positioning portion 21 near a side thereof, and has a hooked retaining portion 22 at the other side thereof. The retaining portion 22 extends outwards.

The second assembly frame 3 can be used to lock hardware subassemblies (not shown) such as foppy disk drives, hard disk drives, or CD-ROM drives. The second assembly frame 3 has a pivotal portion 30 at a side thereof. The second assembly frame 3 can be pivotally joined on the pivotal part 10 of the frame body 1 through the pivotal portion 30.

The second assembly frame 3 has a slide face 31 corresponding to the fixing face 20 of the first assembly frame 2. The second assembly frame 3 has a bar-shaped receiving groove 32 at a sidewall thereof near the retaining portion 22 of the first assembly frame 2. The receiving groove 32 has a broken hole 33 to be penetrated through by the retaining portion 22.

The slide structure 4 comprises a slide groove 40 and a slide sheet 41. The slide groove 40 is disposed on the fixing face 20 of the first assembly frame 2 and has a predetermined radian.

The slide sheet 41 of the slide structure 4 is disposed on the slide face 31 of the second assembly frame 3, and corresponds to and matches the slide groove 10. The slide sheet 41 forms a recumbently U-shaped flute 42. One side edge of the slide groove 40 can be engaged with the flute 42 so that the slide sheet 41 can slide in the slide groove 40.

Figure 5:
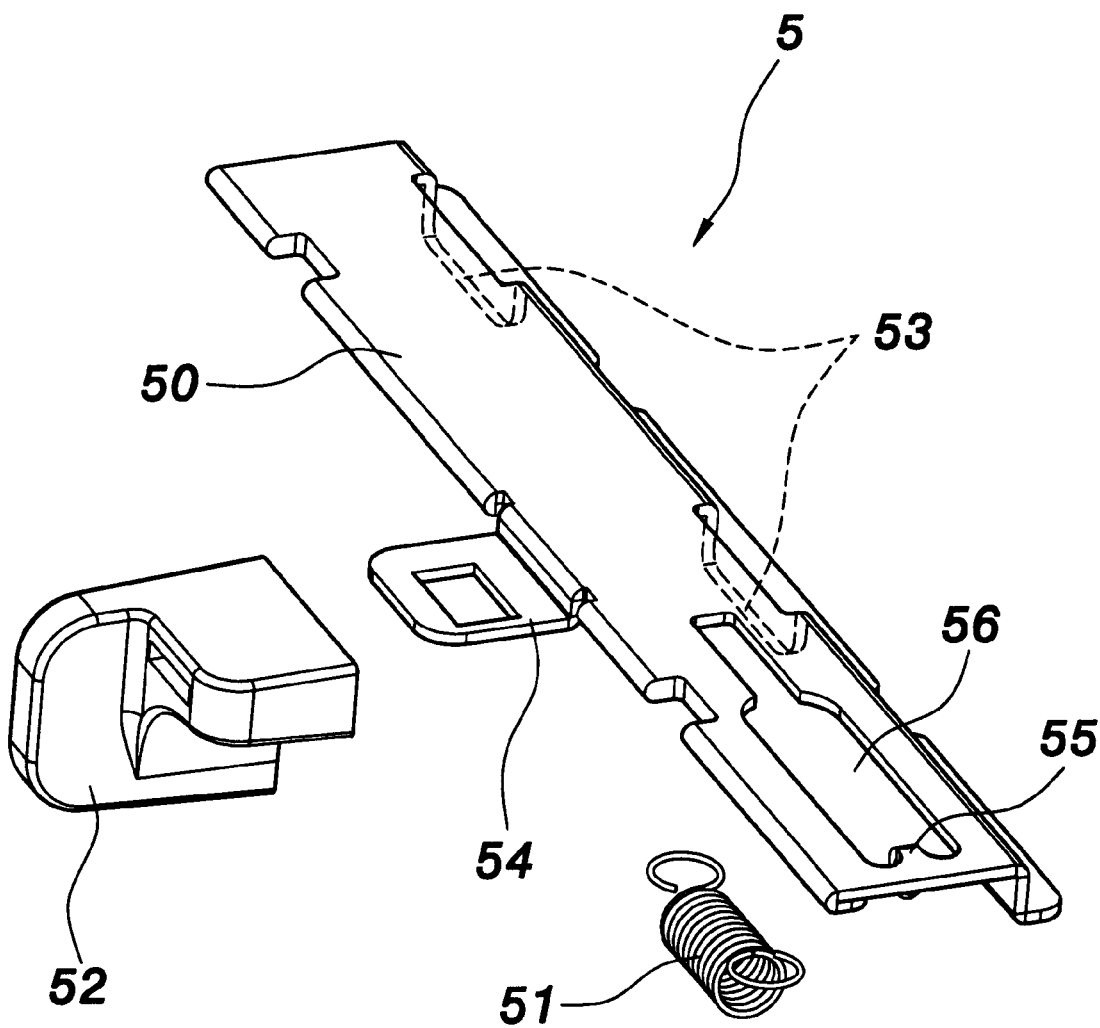
FIG. 5 is an exploded perspective view of a retaining device of the present invention.

As shown in FIG. 5, the retaining device 5 comprises a sheet body 50, a resilient part 51, and a poked portion 52. The sheet body 50 is disposed in the receiving groove 32 of the second assembly frame 3. A retaining groove 53 is disposed at the same side as the broken hole 33 of the receiving groove 32 and the sheet body 50 so that the retaining portion 22 of the first assembly frame 2 can be hooked and retained on the retaining groove 53.

The sheet body 50 of the retaining device 5 has a connection portion 54 at a side opposed to the retaining groove 53. The connection portion 54 projects out of the receiving groove 32 of the second assembly frame 3 to join the poked portion 52 to facilitate poking with hands.

The resilient part 51 of the retaining device 5 can be an extension spring. One end of the resilient part 51 is hooked at a hooking portion 55 of the sheet body 50, and the other end thereof is hooked at a hooking portion 34 of the second assembly frame 3. The hooking portion 55 of the sheet body 50 corresponds to the hooking portion 34 of the second assembly frame 3. The sheet body 50 has a receiving space 56 for receiving the resilient part 51.

An assembly frame of computer housing capable of rotating and positioning of the present invention is thus formed.

Figure 6:
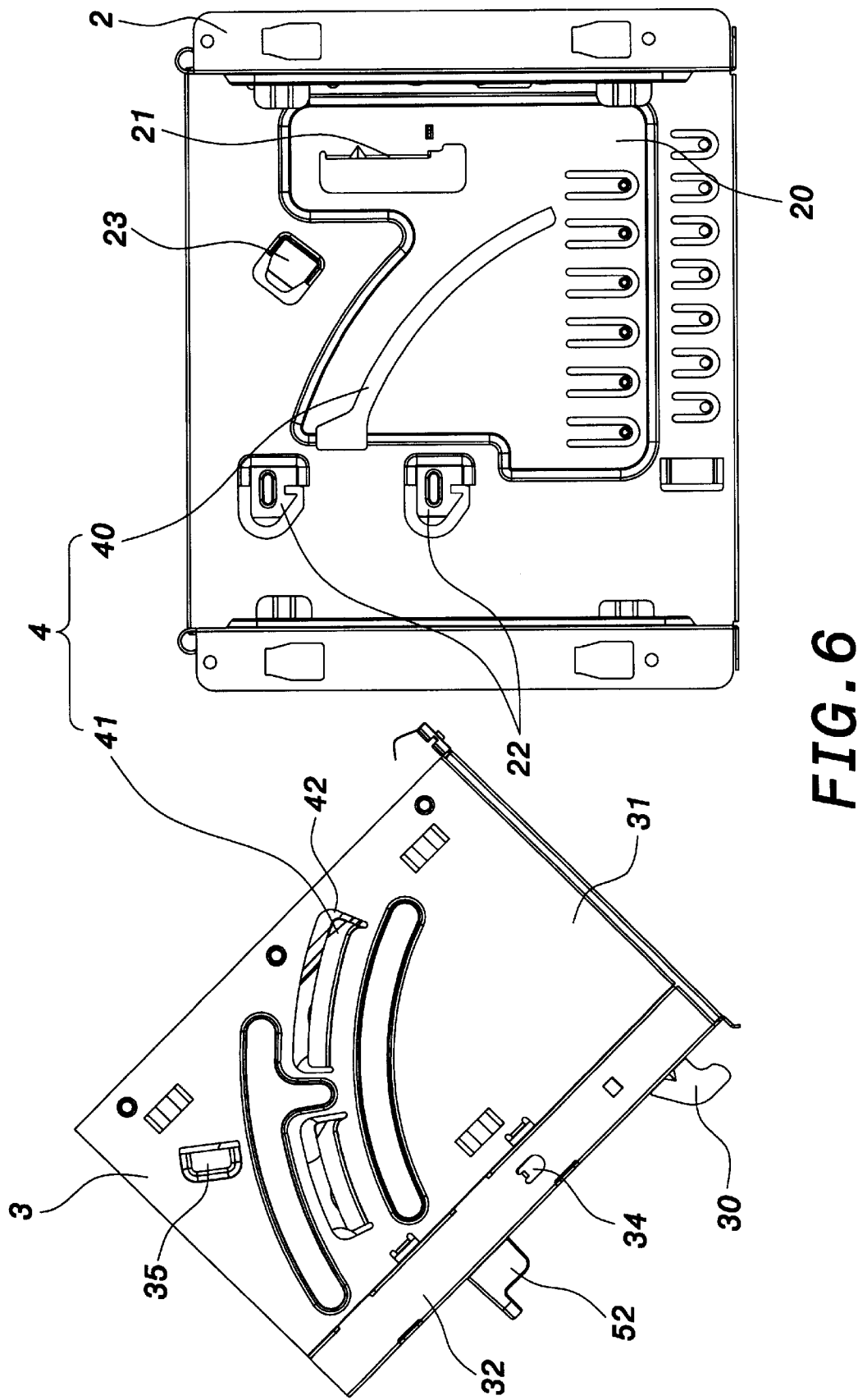
FIG. 6 is an exploded perspective view showing a separate state of the present invention.
Figure 7:
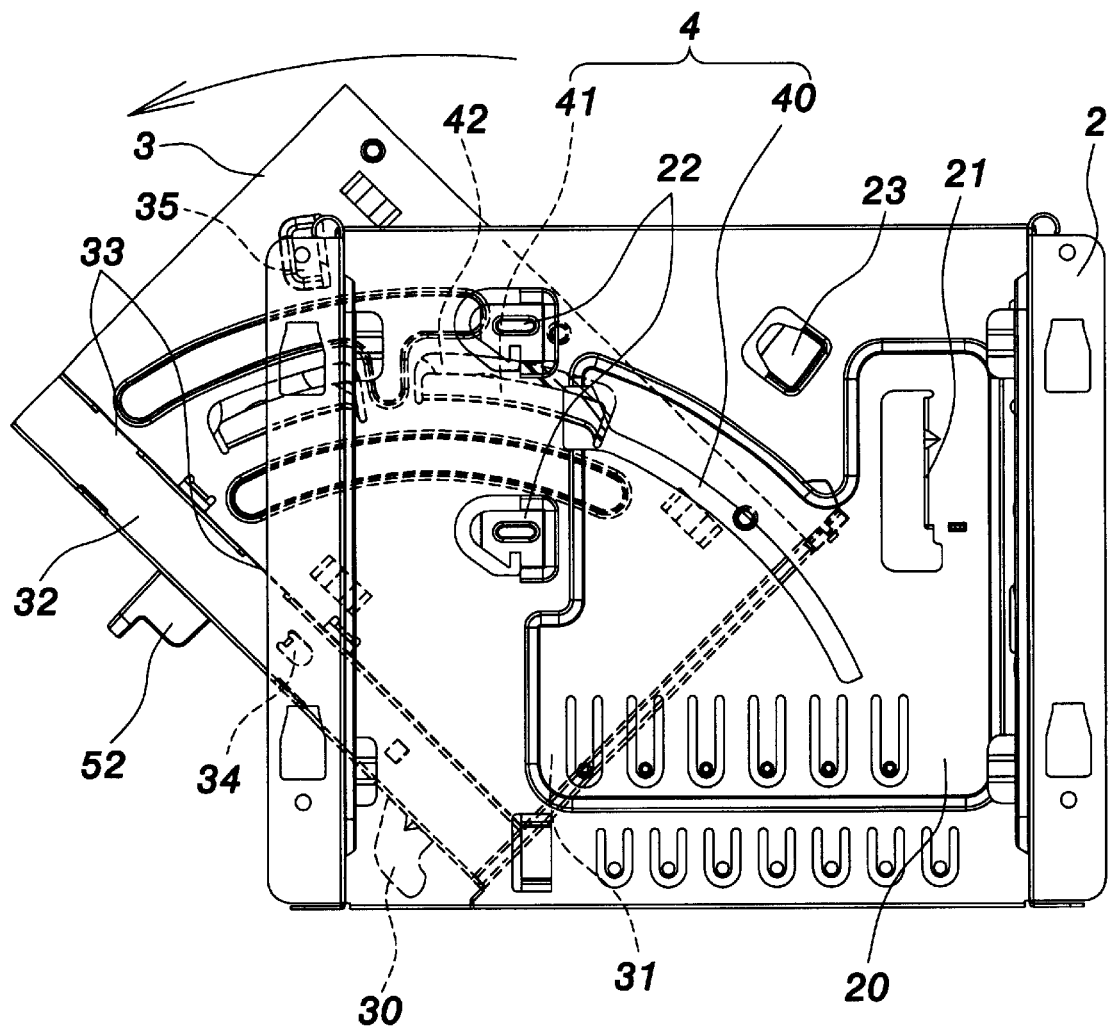
FIG. 7 is a perspective view showing a separate state of the present invention.

As shown in FIG. 3, when a computer maintenance man wants to assemble or disassemble cables of hardware subassemblies (not shown), it is only necessary for him to poke the poked portion 52 of the retaining device 5 to let the retaining groove 53 of the retaining device 5 separate from the retaining portion 22 of the first assembly frame 2. Through sliding of the slide structure 4, the second assembly frame 3 pivotally joined on the frame body 1 can thus be turned over outwards, as shown in FIGS. 6 and 7, hence facilitating assembly or disassembly for the computer maintenance man.

Contrarily, if the second assembly frame 3 needs to be positioned, it is only necessary to turn it over inwards. The second assembly frame 3 can reach a predetermined position through the positioning portion 21 of the first assembly frame 2. Afterwards, the retaining groove 53 of the retaining structure 5 and the retaining portion 22 of the first assembly frame 2 are retained together to let the second assembly frame 3 be hooked below the first assembly frame 2, thereby achieving the object of positioning.

Additionally, as shown in FIG. 2, in order to more firmly hook the second assembly frame 3 below the first assembly frame 2, the first assembly frame 2 has a retaining hook 23, and the second assembly frame 3 has a corresponding retaining groove 35. When the second assembly frame 3 is hooked below the first assembly frame 2, in addition that the second assembly frame 3 can reach a predetermined position through the positioning portion 21 of the first assembly frame 2, the retaining hook 23 and the retaining groove 35 can be retained together to achieve firmer hooking.

Furthermore, as shown in FIG. 3, in order to let the sheet body 50 of the retaining structure 5 achieve positioning effect when poked, the receiving groove 32 of the second assembly frame 3 can have a stop block 36 thereon. The sheet body 50 can exactly abut against the stop block 36 when the retaining groove 53 of the retaining device 5 separates from the retaining portion 22 of the first assembly frame 2. Through this positioning effect, a user can know whether the retaining groove 53 has separated from the retaining portion 22 so that he can turn over the second assembly frame 3.

To sum up, an assembly frame of computer housing capable of rotating and positioning of the present invention can let the first assembly frame 2 and the second assembly frame 3 be staggered to facilitate discrimination, insertion, or disassembly of cables for a computer maintenance man. Moreover, it is very convenient and quick to turn over and position the second assembly frame 3, hence saving manhours for the computer maintenance man.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An assembly frame of computer housing capable of rotating and positioning, comprising:

a frame body having a pivotal part;

a first assembly frame fixedly locked in said frame body and having a fixing face, said fixing face having a positioning portion at a side thereof, the other side of said fixing face extending outwards to form a retaining portion;

a second assembly frame having a pivotal portion pivotally joined on said pivotal part, said second assembly frame having a slide face corresponding to said fixing face, said second assembly frame having a receiving groove at a sidewall thereof near said retaining portion, said receiving groove having a broken hole penetrated through by said retaining portion;

a slide structure comprising a slide groove and a slide sheet, said slide groove being curved and disposed on said fixing face, said slide sheet being disposed on said slide face and corresponding to and matching said slide groove, said slide sheet being capable of sliding on said slide groove; and a retaining device comprising a sheet body, a resilient part, and a poked portion, said sheet body being disposed in said receiving groove and having a retaining groove hooked by said retaining portion, said resilient part being disposed between said sheet body and said second assembly frame, said poked portion being disposed at an outside of said sheet body.

2. The assembly frame of computer housing capable of rotating and positioning as claimed in claim 1, wherein said retaining portion of said first assembly frame is of hooked shape.

3. The assembly frame of computer housing capable of rotating and positioning as claimed in claim 1, wherein said first assembly frame has a retaining hook, and said second assembly frame has a corresponding retaining groove.

4. The assembly frame of computer housing capable of rotating and positioning as claimed in claim 1, wherein said receiving groove of said second assembly frame has a stop block.

5. The assembly frame of computer housing capable of rotating and positioning as claimed in claim 1, wherein said slide sheet of said slide structure has a recumbently U-shaped flute.

6. The assembly frame of computer housing capable of rotating and positioning as claimed in claim 1, wherein said sheet body of said retaining device has a connection portion projecting out of said receiving groove of said second assembly frame to join said poked portion.

7. The assembly frame of computer housing capable of rotating and positioning as claimed in claim 1, wherein said sheet body of said retaining device has a hooking portion, and said second assembly frame has a corresponding hooking portion so that two ends of said resilient part of said retaining device can be respectively hooked.

8. The assembly frame of computer housing capable of rotating and positioning as claimed in claim 1, wherein said sheet body of said retaining device has a receiving space so that said retaining device can receive said resilient part.

9. The assembly frame of computer housing capable of rotating and positioning as claimed in claim 1, wherein said resilient part of said retaining device is an extension spring.

* * * * *